Patented June 13, 1944

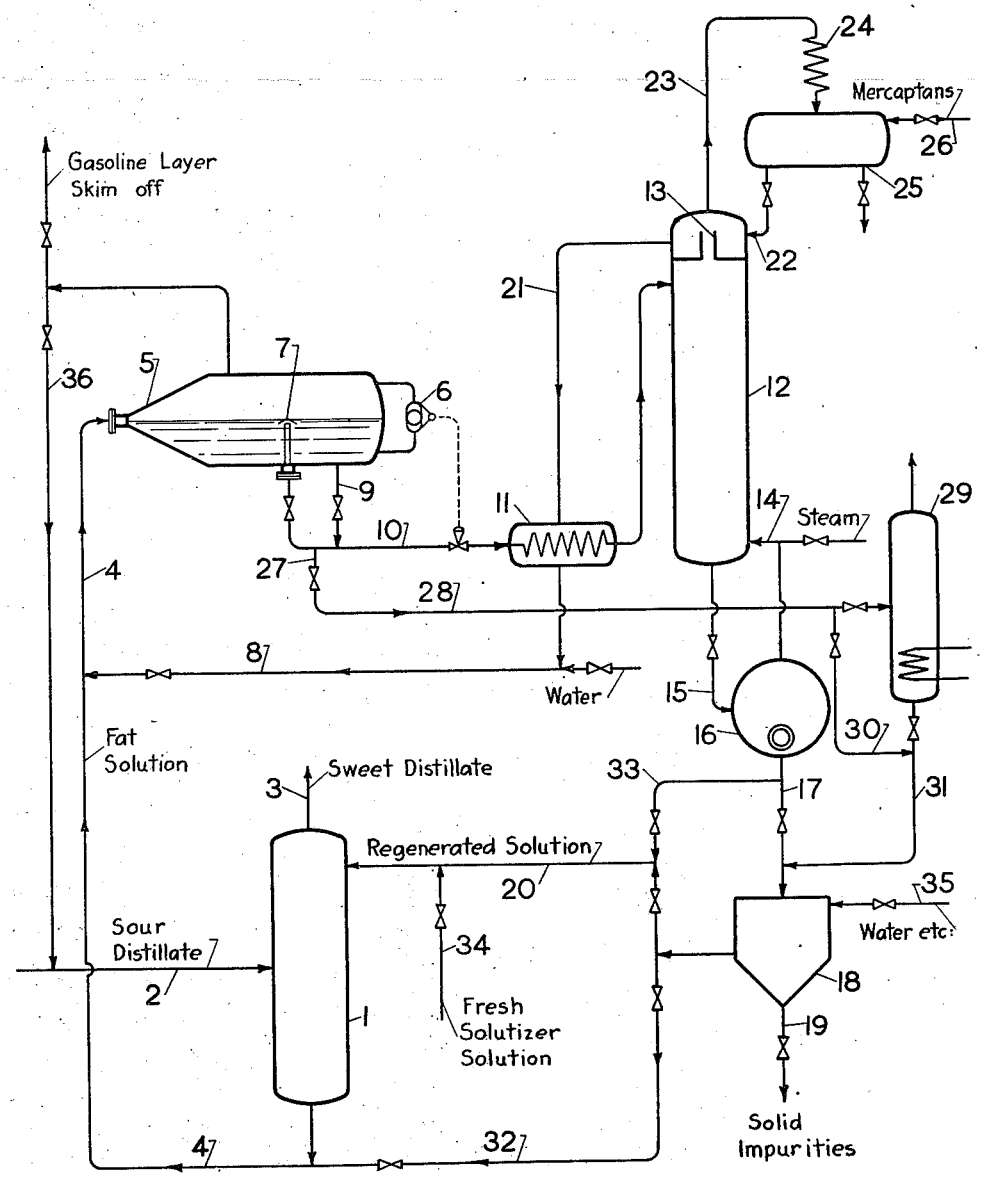

2,351,467

UNITED STATES PATENT OFFICE 2,351,467

PROCESS FOR PURIFYING SOLUTIZER SOLUTIONS

Joseph G. Wilson, Oakland, Calif., assignor to Shell Development Company, San Francisco, Calif., a corporation of Delaware Application May 29, 1941, Serial No. 395,773

4 Claims. (Cl. 252—192)

This invention relates to a process for the purification of spent aqueous solutions of caustic alkali containing absorbed mercaptides and solutizers for mercaptans, and more particularly is concerned with the removal of emulsion-forming impurities which accumulate at the interface between fat solutizer solutions and gasolines in a fat solutizer settler.

It is known that sour hydrocarbon distillates, and more particularly gasoline distillates, can be sweetened by extracting mercaptans contained therein with aqueous solutions of alkali metal hydroxides containing solutizers. The resulting fat solutizer solution containing absorbed mercaptans is then regenerated by steam stripping. In such a process the purpose of the solutizer is to increase the solvent power of the aqueous solution for free mercaptans. Solutizers, therefore, are substances which are readily soluble in aqueous solutions of caustic alkalis, are substantially insoluble in the hydrocarbon oil to be extracted, are good solvents for free mercaptans, are inert to the caustic alkali even at the elevated temperatures of steam stripping, and preferably have a boiling temperature substantially above that of water. To be effective, the solutizer must be present in an amount sufficient to materially raise the solvent power of the aqueous solution for mercaptans, e. g. normally in amounts in excess of about 15%.

Among the many substances having solutizing properties, the following are the most useful: amino and hydroxy alkyl amines in which the alkyl radicals have two to three carbon atoms; glycols, amino glycols, and diamino alcohols of three to five carbon atoms; diamino dihydroxy or amino hydroxy dialkyl ethers or thioethers in which the alkyl radicals have 2 or 3 carbon atoms; alkali metal, and particularly potassium, salts of fatty acids having from 3 to 5 carbon atoms, or of hydroxy or amino fatty acids having from 4 to 7 carbon atoms, or of phenyl acetic or hydroxy, or amino phenyl acetic acids, or of alkyl phenols; or mixtures of the above.

More detailed information about the various solutizers and the amounts in which they are effective has been disclosed in U. S. Patents 2,152,720, 2,152,723, 2,152,166, 2,149,379, 2,149,380, 2,156,577, 2,152,722, and 2,164,851.

A specific embodiment of the solutizer process is described in Yabroff U. S. Patent 2,228,295, of which the present invention is an improvement. According to this Yabroff patent, fat solutizer solution from the extractor is diluted, whereupon hydrocarbons incidentally dissolved during the extraction are selectively sprung and are separated in a fat solution settler, whereby two layers are formed, a hydrocarbon layer and an aqueous layer.

It has been found that in the course of solutizer treatments certain metal sulfides, gums, and other solids insoluble in the solutizer solution are formed. These insolubles build up slowly, often to undesirable concentrations during prolonged operation of the process. Their presence tends to cause emulsion troubles, thereby reducing the effectiveness of the solutizer treatment.

Now, I have discovered that these harmful insoluble impurities can be removed and the foregoing difficulties greatly reduced and often eliminated from the system by a simple skimming operation at the interface between the layers formed in the fat solution settler, i. e. the fat solutizer solution and the sprung hydrocarbon oil. I have found that the insolubles collect at this interface and are kept from settling into the fat solutizer phase due to their being wetted by a film of hydrocarbon oil. As a result, a third layer is formed which contains the accumulated solids and which, for convenience, I call the interfacial layer. To remove these impurities I provide the fat solutizer settler with means for withdrawing this interfacial layer.

The withdrawn interfacial layer which consists of a mixture of solutizer solution, gasoline hydrocarbons and suspended solids may be freed from hydrocarbon oils by distillation. Upon removal of the suspending hydrocarbon oil film, the impurities will settle from the solutizer solution and may be withdrawn.

If the interface is kept at constant level with the aid of appropriate fluid control means, the interfacial layer may be withdrawn through a valved conduit whose intake is positioned at the level of the interface. Often, however, a swing pipe arrangement is preferred which follows the interface in case the latter fluctuates. The conduit for withdrawing the interfacial layer should be provided with a plate spaced a short distance from its mouth to prevent the formation of vortexes.

My process is further illustrated in the attached drawing which represents a simplified flow diagram of my process.

A sour hydrocarbon distillate is introduced from a source not shown into extractor 1 through line 2, and is treated by extraction with an aqueous solution of caustic alkali containing solutizer and under conditions to enable the desired sweetening to take place. Sweet distillate emerges through line 3, and fat aqueous solution containing absorbed mercaptans and hydrocarbons passes through line 4 to a surge or settling tank 5, wherein hydrocarbon oil is separated from the fat solutizer solution, the former being sprung from the fat solution by the introduction of water from the regeneration step or from an outside source through line 8, as is fully described in U. S. Patent 2,228,295. The sprung gasoline may be returned to extractor 1 through lines 36 and 2. Tank 5 is equipped with level controller 6 and conduit 7, the latter having its mouth at the horizon maintained by control 6.

During operation, liquid from the interface in tank 5 between the fat solutizer solution and the hydrocarbon oil is withdrawn continuously or intermittently through conduit 7 at a rate sufficiently but not greatly in excess of that required to prevent building up a large interfacial third layer which contains insoluble solids, gums, etc. Although not shown, it will be obvious that several withdrawal conduits may be provided. The withdrawn liquid may be passed through line 10, together with fat solutizer solution from line 9 and through heat exchanger 11 into steam stripper 12 at a point immediately below tray 13.

Tray 13 divides the stripper 12 into an upper smaller condensate-rectifying section and a lower larger stripping section. The solutizer solution, together with insolubles, flows down through the stripper section in countercurrent flow to the stripping steam which strips absorbed hydrocarbonds from the solids. Steam enters the stripper near its bottom through line 14. The stripped solutizer solution, together with insolubles, passes through line 15 to reboiler 16 where the water of dilution which has been added to the fat solution in line 4 is vaporized, and steam so produced is used for stripping by returning it to the steam stripper through line 14.

Regenerated solutizer solution, together with insolubles, is run through line 17 into settler 18 where the insolubles, which are no longer held in suspension by dissolved hydrocarbons, are allowed to settle and are drawn off through line 19. The regenerated solutizer solution returns to the top of extractor 1 through line 20, to sweeten further amounts of sour distillate.

The steam in stripper 12 rises through plate 13 into the upper condensate-rectifying section. The small amount of mercaptans and alkyl phenols dissolved in the condensate, added through line 22 to stripper 12, are steamed out in this rectifying section and the water of dilution flowing through line 21 is thus substantially free of mercaptans.

The remaining vapors emerge from the condensate-rectifying section of stripper 12 through line 23 and are condensed in condenser 24. The resulting condensate flows into receiving tank 25 where two liquid layers are formed, an upper mercaptan oil layer which is withdrawn through line 26, and a lower water layer containing but very small amounts of mercaptans, which layer is returned through line 22 to the stripping section, where, as indicated above, it is stripped of traces of mercaptan or alkyl phenols.

As an alternative to the foregoing method of purifying solutizer solution, at least a portion of the interfacial layer may be withdrawn from tank 5 through lines 7 and 27 and conducted through line 28 into flash column 29. In this column entrained hydrocarbons are flashed off, forming a residual layer containing fat solutizer solution and solid impurities. This layer is then run from column 29 and through line 31 into settler 18.

In some instances, although not preferable, column 29 may be bypassed, in which case the liquid, together with solid impurities and any entrained hydrocarbons, runs from line 28 through lines 30 and 31 into settler 18.

When convenient or necessary, a plurality of settlers, not shown, may be provided.

In settler 18 the liquid is allowed to separate and is decanted through lines 32 and 4 into tank 5, thus leaving the solid impurities in the settler to be withdrawn and disposed of through line 19. Diluting the liquid with water, preferably at least an equal volume of water, which may be introduced through line 35, is usually desirable and often necessary to enable good separation of solids; and the settling may further be accelerated materially by treatment with lime water or by the addition of metallic oxides or hydroxides whose sulfides are insoluble in water, or of flocular material such as activated magnesium oxide, charcoal, or slurries of inorganic floccular substances, e. g. water-treating sludges, boiler blow-downs, etc. A still further method for additional treatment of the liquid would comprise neutralizing it with carbon dioxide to precipitate organic emulsions and other solids which are separated, and then recausticizing the supernatent liquid with lime for further use as solutizer solution.

When operating this alternative method, lean solutizer solution from reboiler 16 normally bypasses settler 18 and is run through lines 33 and 20 directly to extractor 1, or else through an intermediate tank not shown, so as not to be diluted with the liquid in settler 18. Make-up solutizer solution may be supplied to the system through line 34.

The following example serves to illustrate my invention. In the course of operating a commercial solutizer plant, a portion of the interface layer in the fat solution settler was inadvertently withdrawn and was returned to the extractor, together with the sprung gasoline. Immediately severe emulsion difficulties arose in the extractor, which difficulties subsided, however, in the course of several days of troublesome operation. Thereafter, the interfacial layer was continuously kept at a minimum by taking suction from the settler just below the horizon maintained by the level controller; and introducing the material so removed into the stripper. After several days of modified operation, a sludge of insolubles had accumulated in the lean solution tank, which sludge was withdrawn and discarded.

I claim as my invention:

1. In the process of purifying a fat spent solutizer solution containing hydrocarbons and suspended, insoluble, solid impurities, the improvement comprising settling said solution in a settling zone, whereby there are produced three layers: an aqueous layer, a hydrocarbon layer, and an interfacial layer between said aqueous and hydrocarbon layers and consisting essentially of a mixture of aqueous solutizer solution, hydrocarbons, and suspended hydrocarbon-wetted solid impurities, continuously withdrawing at least portions of said aqueous layer and said hydrocarbon layer, withdrawing said interfacial layer at a rate sufficient to prevent the building up of a large interfacial layer, stripping the withdrawn interfacial layer to remove hydrocarbons wetting the solid impurities, settling said stripped withdrawn portion, whereby the solid impurities, no longer being wetted by hydrocarbons, readily settle out of the aqueous solutizer solution, and separating the solid-free aqueous solutizer solution from the settled solid impurities.

2. In the process of purifying a fat spent solutizer solution containing hydrocarbons and suspended, insoluble solid impurities, the improvement comprising settling said solution in a primary settling zone, whereby there are produced three layers: an aqueous layer, a hydrocarbon layer, and an interfacial layer between said aqueous and hydrocarbon layers and consisting essentially of a mixture of aqueous solutizer solution, hydrocarbons, and suspended hydrocarbon-wetted solid impurities, simultaneously withdrawing at least portions of each of these three layers from the primary settling zone, said interfacial layer being withdrawn at a rate sufficient to prevent the building up of a large interfacial layer, stripping the withdrawn interfacial layer to remove hydrocarbons wetting the solid impurities, settling said stripped withdrawn interfacial layer in a secondary settling zone, whereby the solid impurities, no longer being wetted by hydrocarbons, readily settle out of the aqueous solutizier solution, separating the solid-free aqueous solutizer solution from the settled solid impurities, and returning said separated aqueous solutizier solution to said primary settling zone.

3. In the process of purifying a fat spent solutizer solution containing hydrocarbons and suspended, insoluble solid impurities, the improvement comprising settling said solution in a primary settling zone, whereby there are produced three layers: an aqueous layer, a hydrocarbon layer, and an interfacial layer between said aqueous and hydrocarbon layers and consisting essentially of a mixture of aqueous solutizer solution, hydrocarbons, and suspended hydrocarbon-wetted solid impurities, simultaneously withdrawing at least portions of each of these three layers from the primary settling zone, said interfacial layer being withdrawn at a rate sufficient to prevent the building up of a large interfacial layer, stripping the withdrawn interfacial layer to remove hydrocarbons wetting the solid impurities, transferring the resulting stripped portion to a secondary settling zone, introducing water into said secondary zone and allowing the resulting diluted mixture to separate and to form a layer of diluted solutizer solutions substantially free from solid impurities, and returning said layer of solutizer solution to said primary settling zone.

4. In the process of purifying a fat spent solutizer solution containing hydrocarbons and suspended, insoluble solid impurities, the improvement comprising settling said solution in a primary settling zone, whereby there are produced three layers: an aqueous layer, a hydrocarbon layer, and an interfacial layer between said aqueous and hydrocarbon layers and consisting essentially of a mixture of aqueous solutizer solution, hydrocarbons, and suspended hydrocarbon-wetted solid impurities, simultaneously withdrawing at least portions of each of these three layers from the primary settling zone, said interfacial layer being withdrawn at a rate sufficient to prevent the building up of a large interfacial layer, stripping the withdrawn interfacial layer to remove hydrocarbons wetting the solid impurities, introducing the resulting stripped interfacial layer together with at least an equal amount of water into a secondary settling zone, whereby the solid impurities, no longer being wetted by hydrocarbons, readily settle out of the aqueous solutizer solution, separating the solid-free aqueous solutizer solution from the settled solid impurities, and returning said separated aqueous solutizer solution to said primary settling zone.

JOSEPH G. WILSON.